United States Patent [19]

Truxell

[11] 3,708,980
[45] Jan. 9, 1973

[54] INTERNAL COMBUSTION ENGINE AND METHOD OF OPERATION
[75] Inventor: Robert W. Truxell, Birmingham, Mich.
[73] Assignee: General Motors Corporation, Detroit, Mich.
[22] Filed: July 26, 1971
[21] Appl. No.: 166,035

[52] U.S. Cl. ..................60/274, 60/301, 60/323, 60/900, 123/52 M, 123/32 ST, 123/119 R
[51] Int. Cl. ..................F02b 75/10, F02b 15/00
[58] Field of Search............60/274, 301, 323, 900; 123/119 R, 52 M, 32 ST

[56] References Cited

UNITED STATES PATENTS 2,421,800   6/1947   Martin.......................123/52 M
3,086,839   4/1963   Bloch..........................60/301
3,192,706   7/1965   Dolza..........................60/900
3,592,173   7/1971   Frehe.......................123/52 M Primary Examiner—Douglas Hart
Attorney—J. L. Carpenter et al.

[57] ABSTRACT

Alternate combustion chambers in the engine operating sequence are supplied rich and lean mixtures, respectively. The exhaust gases from the combustion chambers receiving a rich mixture are conducted to an exhaust gas treating unit which reduces oxides of nitrogen formed during combustion, and the exhaust gases from all combustion chambers are conducted to an exhaust gas treating unit which oxidizes hydrocarbons and carbon monoxide remaining after combustion.

6 Claims, 1 Drawing Figure

PATENTED JAN 9 1973
3,708,980
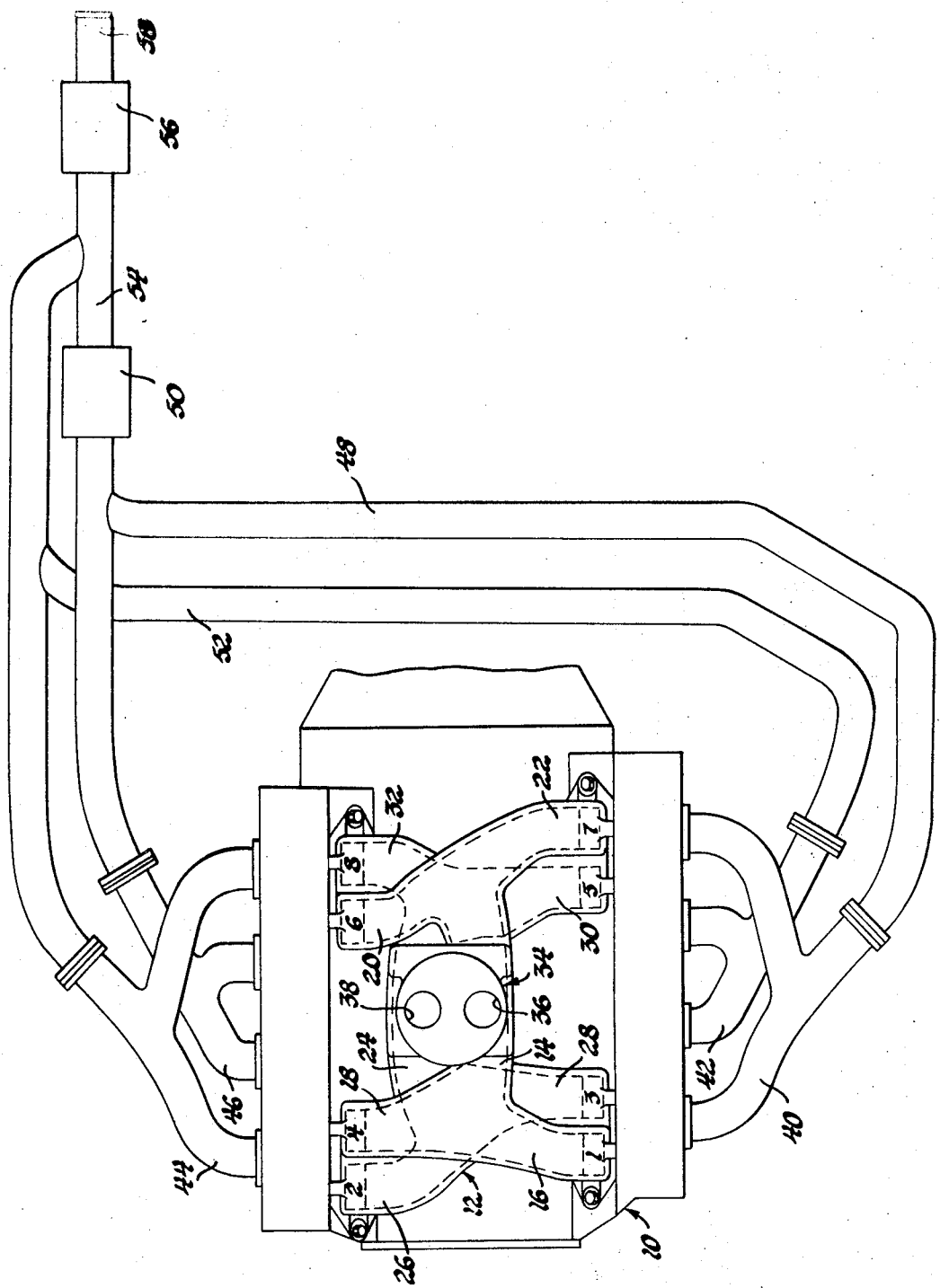
INVENTOR.
Robert W. Truxell
BY
C. K. Veenstra
ATTORNEY

INTERNAL COMBUSTION ENGINE AND METHOD OF OPERATION

It has become well established that formation of oxides of nitrogen during internal combustion engine operation may be minimized by supplying a lean air-fuel mixture to the combustion chambers. However, it also is recognized that driveability of an internal combustion engine powered vehicle is more acceptable when a rich air-fuel mixture is supplied to the combustion chambers.

It is here proposed that a compromise between these two conflicting considerations be achieved by supplying alternate combustion chambers in the engine operating sequence with rich and lean mixtures respectively. It is anticipated that this approach could reduce formation of oxides of nitrogen to an acceptable level without degrading driveability of the vehicle to an unacceptable level. The exhaust gases emitted from the combustion chambers receiving a rich air-fuel mixture may then be conducted to an exhaust gas treating unit, such as a catalytic converter, designed to reduce oxides of nitrogen, and the exhaust gases from all the combustion chambers may be directed to an exhaust gas treatment device, such as a catalytic converter, designed to oxidize hydrocarbons and carbon monoxide remaining from the combustion process.

The details as well as other objects and advantages of this invention are set forth below and are illustrated in the accompanying drawing which shows a top plan view of an internal combustion engine and its associated exhaust system incorporating this invention.

Referring to the drawing, an internal combustion engine 10 of the V-8 type has a plurality of combustion chambers indicated by the numerals 1 through 8 arranged with the odd-numbered combustion chambers on the left side of the engine, in sequence from front to rear, and with the even-numbered combustion chambers arranged on the right side of the engine, also in sequence from front to rear. Conventionally, the combustion chambers are fired in the order of 1-8-4-3-6-5-7-2, but any acceptable firing order may be utilized with this invention.

A bilevel intake manifold 12 disposed on engine 10 has an upper level including a longitudinally extending plenum 14 and transversely extending runners 16, 18, 20 and 22 which respectively supply an air-fuel mixture to combustion chambers 1, 4, 6 and 7. Manifold 12 has a lower level including a longitudinally extending plenum 24 and transversely extending runners 26, 28, 30 and 32 which respectively supply an air-fuel mixture to combustion chambers 2, 3, 5 and 8.

A carburetor 34 is disposed on intake manifold 12 and includes left- and right-hand bores 36 and 38 which respectively supply an air-fuel mixture to the upper and lower levels of intake manifold 12.

It will be appreciated that, in this embodiment, carburetor 34 and manifold 12 comprise the induction system which delivers an air-fuel charge to the combustion chambers.

In this invention, it is contemplated that one of the carburetor bores will supply an air-fuel mixture substantially richer than stoichiometric and the other carburetor bore will supply an air-fuel mixture substantially leaner than stoichiometric; in the illustrated embodiment, left-hand bore 36 is calibrated rich and right-hand bore 38 is calibrated lean. As an alternative, a fuel injection system could be readily calibrated to supply a rich air-fuel mixture to some combustion chambers and a lean air-fuel mixture to the other combustion chambers; in an electronic fuel injection system, for example, some injectors could have large orifices and other injectors could have small orifices.

On the left-hand side of the engine, an exhaust manifold 40 is provided for combustion chambers 1 and 7, and a separate exhaust manifold 42 is provided for combustion chambers 3 and 5. Similarly, on the right-hand side of the engine an exhaust manifold 44 is provided for combustion chambers 2 and 8, and an exhaust manifold 46 is provided for combustion chambers 4 and 6. Exhaust manifolds 40 and 46 are connected by a Y-pipe 48 to an exhaust gas treating device 50, such as a catalytic converter, designed to reduce oxides of nitrogen formed during the combustion process. Exhaust manifolds 42 and 44 are similarly connected by a Y-pipe 52. Y-pipe 52, together with a discharge pipe 54 leading from device 50, is connected to an exhaust gas treating device 56, such as a catalytic converter, designed to oxidize hydrocarbons and carbon monoxide remaining after the combustion process. A tail pipe 58 leads from oxidizing device 56 to the atmosphere; tail pipe 58 may contain other exhaust gas treating or silencing devices as desired.

From the foregoing, it will be appreciated that half of the combustion chambers of engine 10 (chambers 2, 3, 5 and 8 in the illustrated embodiment) receive a lean air-fuel mixture which minimizes formation of oxides of nitrogen during combustion, while the remaining combustion chambers receive a rich air-fuel mixture which enhances vehicle driveability. If necessary, the oxides of nitrogen formed by combustion of the rich air-fuel mixture are reduced in reducing device 50 and the hydrocarbons and carbon monoxide remaining after combustion in all combustion chambers are oxidized in an oxidizing device 56.

It will be further appreciated that this invention may be employed in other embodiments of V-8 engines and in engines with other numbers or arrangements of combustion chambers.

I claim:

1. The method of operating an internal combustion engine having a pair of sequentially operative combustion chambers, a device effective to reduce the oxides of nitrogen constituents of combustion chamber exhaust gases, and a device effective to oxidize the hydrocarbon and carbon monoxide constituents of combustion chamber exhaust gases, comprising the steps of:

delivering an air-fuel charge substantially richer than stoichiometric to one of said combustion chambers, delivering an air-fuel charge substantially leaner than stoichiometric to the other of said combustion chambers, delivering the exhaust gases from said one combustion chamber to said reducing device, and delivering the exhaust gases from said other combustion chamber, together with the exhaust gases from said one combustion chamber after such exhaust gases have passed through said reducing device, to said oxidizing device, whereby oxides of nitrogen formed during combustion of the rich air-fuel charge are reduced in said reducing device and whereby hydrocarbons and carbon monoxide remaining from combustion of both rich and lean air-fuel charges are oxidized in said oxidizing device.

2. The method of operating an internal combustion engine having a plurality of combustion chambers in which a first combustion chamber initially begins a series of combustion events, a second combustion chamber begins a series of combustion events after said first combustion chamber begins its series, a third combustion chamber begins a series of combustion events after said second combustion chamber begins its series, and a fourth combustion chamber begins a series of combustion events after said third combustion chamber begins its series, said method comprising the steps of:

delivering an air-fuel charge substantially richer than stoichiometric to said first and third combustion chambers, delivering an air-fuel charge substantially leaner than stoichiometric to said second and fourth combustion chambers, delivering the exhaust gases from said first and third combustion chambers through a reducing catalyst adapted to promote reduction of oxides of nitrogen in such exhaust gases, and delivering the exhaust gases from all of said combustion chambers through an oxidizing catalyst adapted to promote oxidation of hydrocarbons and carbon monoxide in such exhaust gases.

3. An internal combustion engine comprising a pair of combustion chambers, means for delivering an air-fuel charge substantially richer than stoichiometric to one combustion chamber and an air-fuel charge substantially leaner than stoichiometric to the other combustion chamber, a reducing catalytic converter adapted to promote reduction of oxides of nitrogen in internal combustion engine exhaust gases, an oxidizing catalytic converter adapted to promote oxidation of hydrocarbons and carbon monoxide in internal combustion engine exhaust gases, first exhaust passage means connecting said one combustion chamber to said reducing converter to direct exhaust gases resulting from combustion of the rich mixture to said reducing converter, second exhaust passage means connecting said other combustion chamber to said oxidizing converter to direct exhaust gases resulting from combustion of the lean mixture to said oxidizing converter, and means connecting said reducing converter to said oxidizing converter to direct exhaust gases resulting from combustion of the rich mixture to said oxidizing converter after passing through said reducing converter.

4. An internal combustion engine comprising:

a plurality of sequentially operative combustion chambers, first induction system means connected to a first set of combustion chambers and delivering thereto an air-fuel charge substantially richer than stoichiometric and second induction system means connected to a second set of the remaining combustion chambers and delivering thereto an air-fuel charge substantially leaner than stoichiometric, the combustion chambers in said first set alternating in operation with the combustion chambers in said second set, a first device effective to reduce oxides of nitrogen in combustion chamber exhaust gases, exhaust passage means connecting said first set of combustion chambers to said first device, a second device effective to oxidize hydrocarbons and carbon monoxide in combustion chamber exhaust gases, and exhaust passage means connecting said second set of combustion chambers and said first device to said second device, whereby oxides of nitrogen formed during combustion of the rich air-fuel charge in said first set of combustion chambers are reduced in said first device and whereby hydrocarbons and carbon monoxide remaining after combustion of both the rich and the lean air-fuel charge are oxidized in said second device.

5. The internal combustion engine of claim 4 wherein:

said plurality of combustion chambers consists of eight combustion chambers, said combustion chambers are arranged in two groups with one group consisting of combustion chambers numbered 1, 3, 5 and 7 disposed serially on one side of the engine and with the other group consisting of combustion chambers numbered 2, 4, 6 and 8 disposed serially on the other side of the engine, said first set of combustion chambers consists of combustion chambers numbered 1, 4, 6 and 7 and said second set of combustion chambers consists of combustion chambers numbered 8, 3, 5 and 2, and said induction systems include a bilevel manifold having an upper level connected to one set of combustion chambers and a lower level connected to the other set of combustion chambers.

6. The method of operating a vehicle powering internal combustion engine having a plurality of combustion chambers in which a first combustion chamber initially begins a series of combustion events, a second combustion chamber begins a series of combustion events after said first combustion chamber begins its series, a third combustion chamber begins a series of combustion events after said second combustion chamber begins its series, and a fourth combustion chamber begins a series of combustion events after said third combustion chamber begins its series, said method comprising the steps of:

delivering an air-fuel charge substantially richer than stoichiometric to said first and third combustion chambers, and delivering, over the entire range of engine operation, an air-fuel charge substantially leaner than stoichiometric to said second and fourth combustion chambers, whereby the formation of oxides of nitrogen during combustion may be minimized without sacrificing driveability of the vehicle.

* * * * *